US006493237B1

(12) United States Patent
Moody et al.

(10) Patent No.: US 6,493,237 B1
(45) Date of Patent: Dec. 10, 2002

(54) PRESSURE SENSOR HOUSING

(75) Inventors: Michael R. Moody, Moline, IL (US); Craig A. Cobert, Moline, IL (US); Chris D. Frost, Moline, IL (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 09/985,452

(22) Filed: Nov. 2, 2001

(51) Int. Cl.[7] .................................................. H05K 7/02
(52) U.S. Cl. ........................ 361/760; 361/600; 361/679; 257/727; 73/756
(58) Field of Search ................................. 361/600, 601, 361/679, 760, 761, 763, 820, 821; 73/724, 727, 756; 338/36, 47

(56) References Cited

U.S. PATENT DOCUMENTS

| | | | | |
|---|---|---|---|---|
| 5,648,615 A | * | 7/1997 | Jeske et al. | 73/756 |
| 5,691,480 A | * | 11/1997 | Cook, Sr. et al. | 73/756 |
| 6,177,727 B1 | * | 1/2000 | Hart, Jr. et al. | 257/727 |
| 6,055,864 A | * | 5/2000 | Stiller et al. | 73/724 |
| 6,092,425 A | * | 7/2000 | Kuznia et al. | 73/726 |
| 6,354,153 B1 | * | 3/2002 | Weiblen et al. | 73/756 |

\* cited by examiner

*Primary Examiner*—Boris Chervinsky
(74) *Attorney, Agent, or Firm*—Lowe Hauptman Gilman & Berner, LLP

(57) ABSTRACT

A novel pressure sensor housing configuration and method of assembly are described. A pressure transducer including a tube for measuring pressure and leads for providing signals indicated of the measured pressure is mounted to a printed circuit board. A housing including elongated mounting portions or legs taller than the pressure sensor transducer and a cavity for receiving the tube is mounted over the pressure transducer to the printed circuit board. The housing is connected to the printed circuit board using the elongated mounting portions. A pneumatic connection to the housing provides a pressure to be measured to the cavity and thence to the pressure transducer tube.

18 Claims, 4 Drawing Sheets

PRESSURE SENSOR HOUSING

FIELD OF THE INVENTION

The present invention relates generally to a novel sensor housing and method of use thereof, and more particularly, to a pressure sensor housing and method of use thereof.

BACKGROUND ART

Pneumatically and electrically interfacing with a printed circuit board (PCB) mounted TO-8 pressure transducer is a recurring problem. Current solutions, interface TO-8 pressure transducers using two circuit boards in a stacked configuration. In order to manufacture the stacked configuration, manufacturing alignment/assembly issues force an expensive assembly process.

A side view of a prior art mounting configuration of a pressure transducer is shown in the diagram of FIG. 1. A standard size, i.e., TO-8, pressure transducer 10 is connected to a lower printed circuit board 12 and electrical leads 14 extend from the bottom of the pressure transducer 10 through lower board 12. Pressure transducer may be any known pressure transducer for generating a signal representative of a pressure sensed. The leads 14 may be attached to a lower surface 12A of the lower board 12, may be routed to an upper surface 12B of lower board 12, or may be connected to another board (not shown). In other embodiments, the leads 14 may not extend through lower board 12 at all, rather they may connect directly to the surface of lower board 12.

Pressure transducer 10 has a tube 16 extending upward, i.e., away from the upper surface 10A of transducer 10 and the upper surface 12B of lower board 12, for directing pressure to a sensing portion 18 of transducer 10. The sensing portion 18 is located within the radius of intersection of the tube 16 and the upper portion 10A of the transducer 10. Additional transducers may include additional sensing portions (not shown) to enable the transducer to provide differential pressure readings.

The upper end of tube 16, opposite transducer 10, is open to the pressure to be measured. The pressure to be measured includes a gas or liquid. The upper end of tube 16 extends through an upper printed circuit board 20 mounted (not shown) on lower board 12. The upper board 20 has an upper surface 20A and a lower surface 20B, respectively facing away from upper surface 12B of lower board 12 and facing toward the upper surface 12B of lower board 12. That is, upper board 20 is in a stacked configuration with lower board 12.

The upper end of tube 16 extends into a cavity 22 formed by housing 24 mounted on the upper surface 20A of upper board 20. The housing 24 is generally cylindrically shaped and includes a mounting points 26A, 26B for connection to the upper surface 20A. Housing 24 is typically bolted to the upper board 20 using bolts passing through upper board 20 and mounting points 26A and 26B. Pressure to be measured or monitored using transducer 10 is supplied to cavity 22 via a barb hook-up 28 (also referred to as a pneumatic connection) providing a passage into cavity 22. Barb hook-up 28 is a generally cylindrical shaped tube having a ridge 30 (shown more clearly in conjunction with FIG. 2) encircling the outside surface for retaining attached supply tubing (not shown). Typically, flexible tubing is used to supply a gas or liquid under pressure from a remote location to barb hook-up 28 and thus into cavity 22 for measurement by transducer 10.

The prior art or "two-board" design is shown in a perspective view in FIG. 2 prior to assembly. Specific additional features viewable in FIG. 2 include a through-hole 31 for insertion of upper end of tube 16 through upper board 20 and into cavity 22, mounting through-holes 32A and 32B for receiving the mounting bolts securing housing 24 to upper board 20 via mounting points 26A and 26B, respectively, and ridge 30 on barb hook-up 28 for retaining supply tubing connected to the barb hook-up.

Also shown in FIG. 2 is central axis line C (dashed line) depicting the necessary alignment of lower board 12, transducer 10, upper board 20, and housing 24 for proper assembly. Each of the component parts must be aligned for assembly, e.g., the upper portion of tube 16 must be aligned with through-hole 31 and upper board 20 must be aligned with the mounting mechanism attaching it to lower board 12. Thus, multiple openings in the upper board 20 must be aligned for mounting to lower board 12. Misalignment of components increases the difficulty of assembly. Further, replacement or maintenance is made more difficult by having multiple parts to be aligned. Thus, there is a need in the art for a simpler pressure sensor housing mounting configuration to reduce or eliminate alignment issues.

Somewhat relatedly, due in part to the alignment issues described above and because of the multiplicity of component parts involved, the two-board design requires a longer assembly time than a single board design. Thus, there is a need in the art to reduce the assembly time required for a pressure sensor housing configuration. Further, because assembly is simplified with a single-board design, there is no additional specialized tooling required for assembly. With a two-board design, additional special tools are needed to ensure proper alignment of upper board 20 over lower board 12, housing 24 on upper board 20, and tube 16 inside housing 24 and upper board 20. Once aligned, the piece parts need to be attached to one another, as well. Thus, there is a need in the art to eliminate the necessity of special tools for assembly. In conjunction with a reduction in the number of tools required and a simplified alignment process, an important by-product is the reduction of the amount of mounting hardware required for assembly. This reduces the cost and complexity of the assembly process. Thus, there is a need in the art for a sensor housing configuration requiring a reduced amount of mounting hardware.

Necessarily also, the amount of assembly-induced rework due to errors in assembly is increased because of the complicated nature of the two-board design. More component parts are handled, moved, and removed increasing the possibility of errors and/or breakage of components. Thus, there is a need in the art to reduce assembly-induced rework in the sensor housing configuration.

Further, in the two-board design it is difficult to test the individual component parts prior to assembly because the entire configuration must be assembled for a test.

That is, the housing 24 must be mounted to upper board 20 which must be attached to lower board 12 which must have the transducer 10 mounted thereon. Therefor, there is a need in the art for a mounting configuration more conducive to testing of components prior to assembly.

DISCLOSURE/SUMMARY OF THE INVENTION

It is therefore an object of the present invention to provide a simpler pressure sensor housing mounting configuration to reduce or eliminate alignment issues.

Another object of the present invention is to provide a mounting configuration more conducive to component-level testing prior to assembly.

Still another object of the present invention is to reduce the assembly time required for a pressure sensor housing configuration.

Further still, another object of the present invention is to eliminate the necessity of special tools for assembly.

Another object of the present invention is to provide a sensor housing configuration requiring a reduced amount of mounting hardware.

Still another object of the present invention is to reduce assembly-induced rework in the sensor housing configuration.

The above described objects are fulfilled by a pressure transducer including a tube for measuring pressure and leads for providing signals indicated of the measured pressure is mounted to a printed circuit board. A housing including elongated mounting portions or legs taller than the pressure sensor transducer and a cavity for receiving the tube is mounted over the pressure transducer to the printed circuit board. The housing is connected to the printed circuit board using the elongated mounting portions. A pneumatic connection to the housing provides a pressure to be measured to the cavity and thence to the pressure transducer tube.

An apparatus aspect of the pressure transducer mounting configuration includes a printed circuit board, a pressure transducer mounted on the printed circuit board, and a housing surrounding the pressure transducer on a side of the printed circuit board. The housing is mounted to the printed circuit board. A further embodiment includes a pressure transducer having a tube for receiving pressure to be measured by the pressure transducer and the housing further includes a cavity for providing the pressure to the pressure transducer and a sealing ring for receiving and sealing the tube of the pressure transducer in the cavity open to the pressure.

An apparatus aspect of the housing includes a central and generally cylindrical portion having (a) a central cavity open at the bottom of the cylindrical portion and (b) two elongated mounting portions connected at opposing locations along the bottom of the outside surface of the longitudinal cylindrical portion and long enough to extend above a pressure transducer when the bottom edge of the mounting portions are mounted on a printed circuit board. The housing further includes a pneumatic connection connected to a through-hole in the side of the longitudinal cylindrical portion and opening to the central cavity for providing pressure. A further embodiment of the housing includes a sealing ring located within the central cavity and adapted for sealing around a tube inserted into the open bottom of the central cavity.

A method aspect of mounting a pressure transducer housing on a printed circuit board includes mounting a pressure transducer to the printed circuit board and mounting a housing to the printed circuit board. The housing surrounds the pressure transducer on a side of the printed circuit board and provides a pressure to be measured to the pressure transducer. In a further embodiment the method includes a pressure transducer including a tube for receiving the pressure to be measured and a housing including a cavity for receiving the tube and providing the pressure to the transducer.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for a novel pressure sensor housing configuration are described. In the following description, for purposes of explanation, numerous specific details are set forth in order to provide a thorough understanding of the present invention.

It will be apparent; however, that the present invention may be practiced without these specific details. In other instances, well-known structures and devices are shown in block diagram form in order to avoid unnecessarily obscuring the present invention.

Top Level Description

The present invention is a single board solution to the above-described two-board configuration for mounting a pressure sensor housing. This single board solution includes the sensor housing and pneumatic connection in a single, easily alignable and mountable component for alignment and mounting on a printed circuit board including a pressure sensor transducer.

Detailed Description

Figure 1:
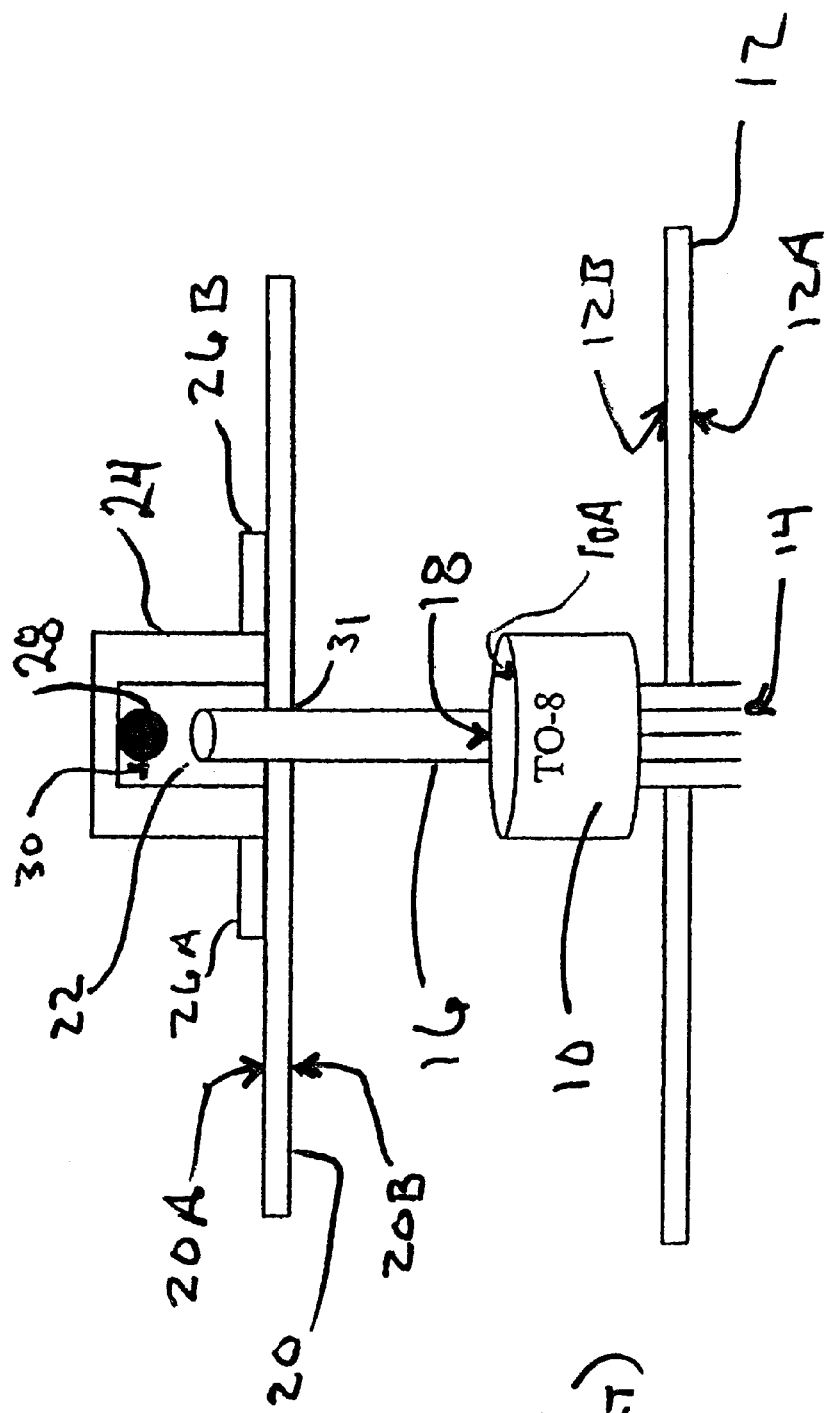
FIG. 1 is a side view of a prior art pressure transducer mounting configuration.
Figure 3:
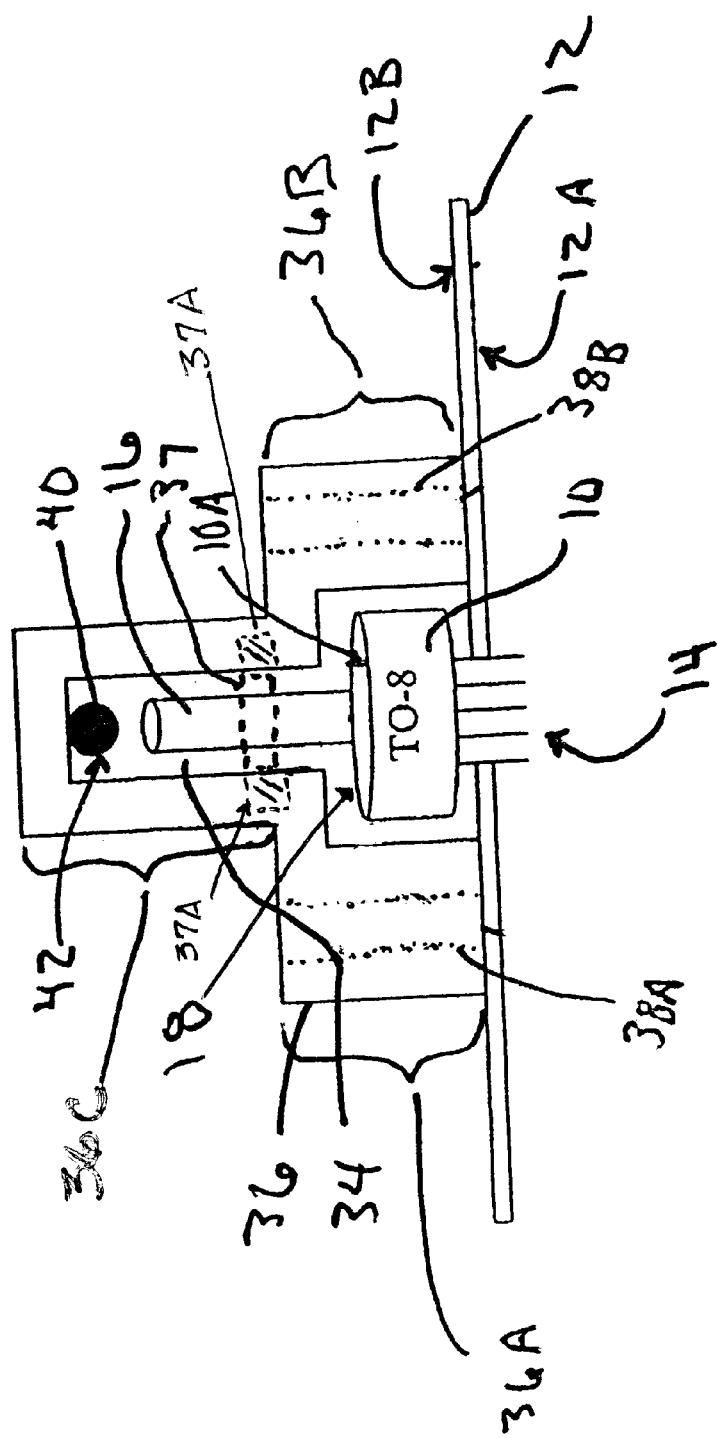
FIG. 3 is a side view of an embodiment of a pressure transducer mounting configuration of the present invention.

The present invention is now described with reference to FIG. 3. A side view of a single board solution for mounting a pressure sensor housing is shown in FIG. 3. Similar to the two-board solution of FIG. 1, the single board solution includes a standard size, i.e., TO-8, pressure transducer 10 connected to a printed circuit board 12 and has electrical leads 14 extending from the bottom of the pressure transducer 10 through lower board 12 for carrying signals representative of the output of the transducer. The pressure transducer 10 may be any known pressure transducer for generating a signal representative of a pressure sensed. The leads 14 may be attached to a lower surface 12A of the board 12, may be routed to an upper surface 12B of board 12, or may be connected to another board (not shown). In other embodiments, the leads 14 may not extend through board 12 at all, rather they may connect directly to the surface of board 12.

Pressure transducer 10 has a tube 16 extending upward, i.e., away from the upper surface 10A of transducer 10 and the upper surface 12B of board 12, for directing pressure to a sensing portion 18 of transducer 10. The sensing portion 18 is located within the radius of intersection of the tube 16 and the upper portion 10A of the transducer 10. Additional transducers may include additional sensing portions (not shown) to enable the transducer to provide differential pressure readings.

The upper end of tube 16, opposite transducer 10, is open to the pressure to be measured. The pressure to be measured includes a gas or liquid.

The upper end of tube 16 extends into a cavity 34 formed by housing 36 mounted on the upper surface 12B of board 12. The housing 36 includes a generally cylindrically shaped center portion 36C and elongated mounting portions 36A, 36B for connecting the housing to the upper surface 12B. The center portion 36C encloses cavity 34 on the top and sides. The bottom of the cavity includes a sealing ring 37 (dashed lines) for receiving the tube 16 and providing a seal retaining the pressure in cavity 34. Sealing ring 37 is mounted in place in housing 36 toward the bottom of center portion 36C in an interior circular groove 37A for retaining the sealing ring. Groove 37A retains sealing ring 37 in position within cavity 34 and prevents sealing ring movement.

The elongated mounting portions 36A, 36B are attached on opposing outside portions of the cylindrical surface of center portion 36C of housing 36 toward the bottom. In effect, the elongated mounting portions 36A and 36B form two legs supporting center portion 36C of the housing over and aligned with pressure transducer 10 and tube 16.

Figure 2:
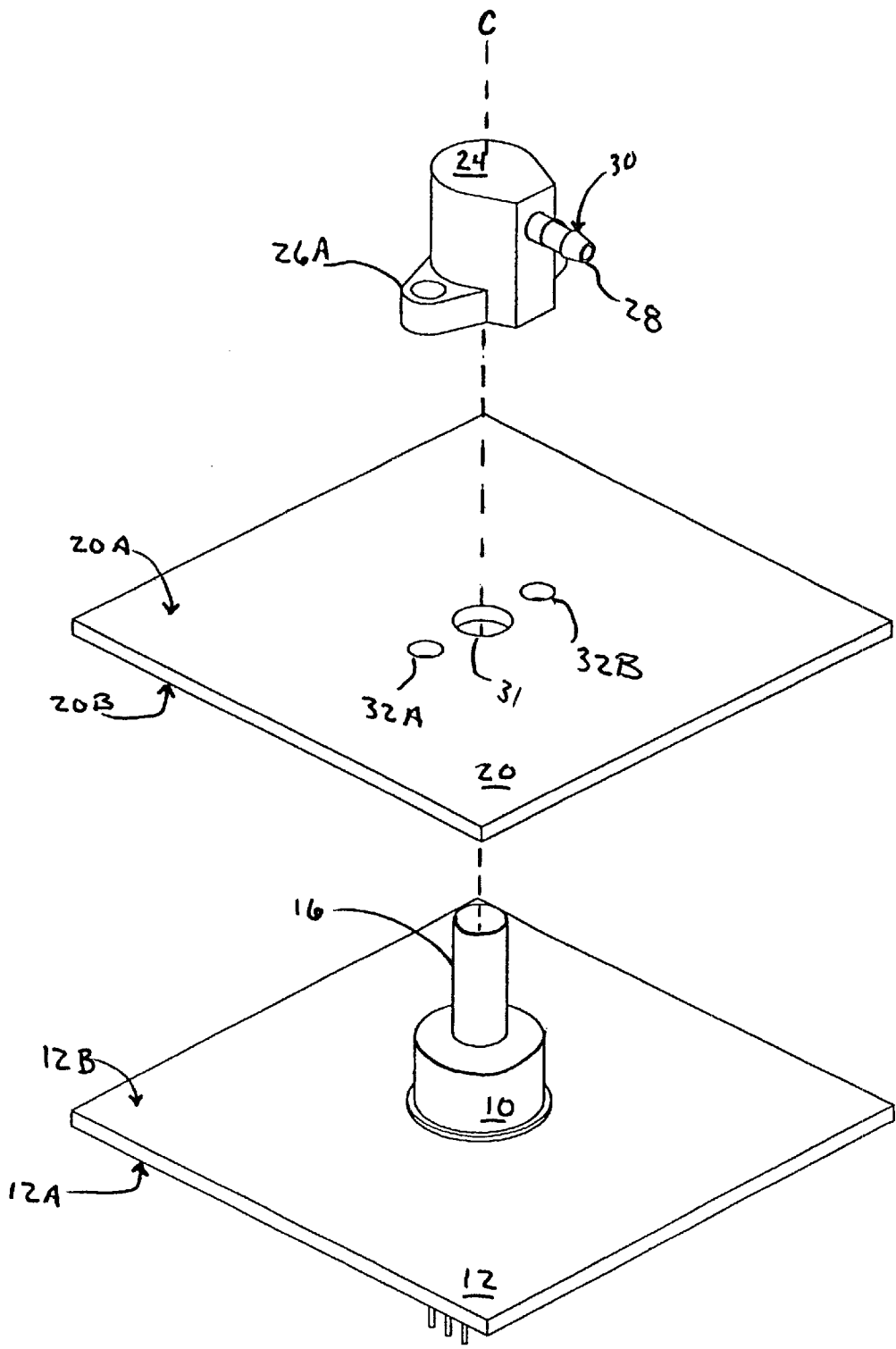
FIG. 2 is a perspective view of the prior art mounting configuration of FIG. 1.

Housing 36 is attached to the board 12 using bolts (not shown) passing through-holes 44A and 44B (shown in FIG. 2) in board 12 and threading into threaded holes 38A, 38B (dotted lines) in elongated mounting portions 36A and 36B. Providing threaded holes for mounting bolts to secure housing 36 to board 12 eliminates the need for washers and nuts required by prior approaches and reduces the number of required parts and assembly complexity. There are fewer parts required and much less chance of the parts being lost or dropped. Alternative designs not requiring threaded bolts may be used and are to be understood to be within the scope of the present invention.

Pressure to be measured or monitored using transducer 10 is supplied to cavity 34 via a barb hook-up 40 (also referred to as a pneumatic connection) providing a passage into cavity 34. Barb hook-up 40 is a generally cylindrical shaped tube having a ridge 42 (shown more clearly in conjunction with FIG. 4) encircling the outside surface for retaining attached supply tubing (not shown). Typically, flexible tubing is used to supply a gas or liquid under pressure from a remote location to barb hook-up 40 and thus into cavity 34 and tube 16 to sensing portion 18 for measurement by transducer 10.

Figure 4:
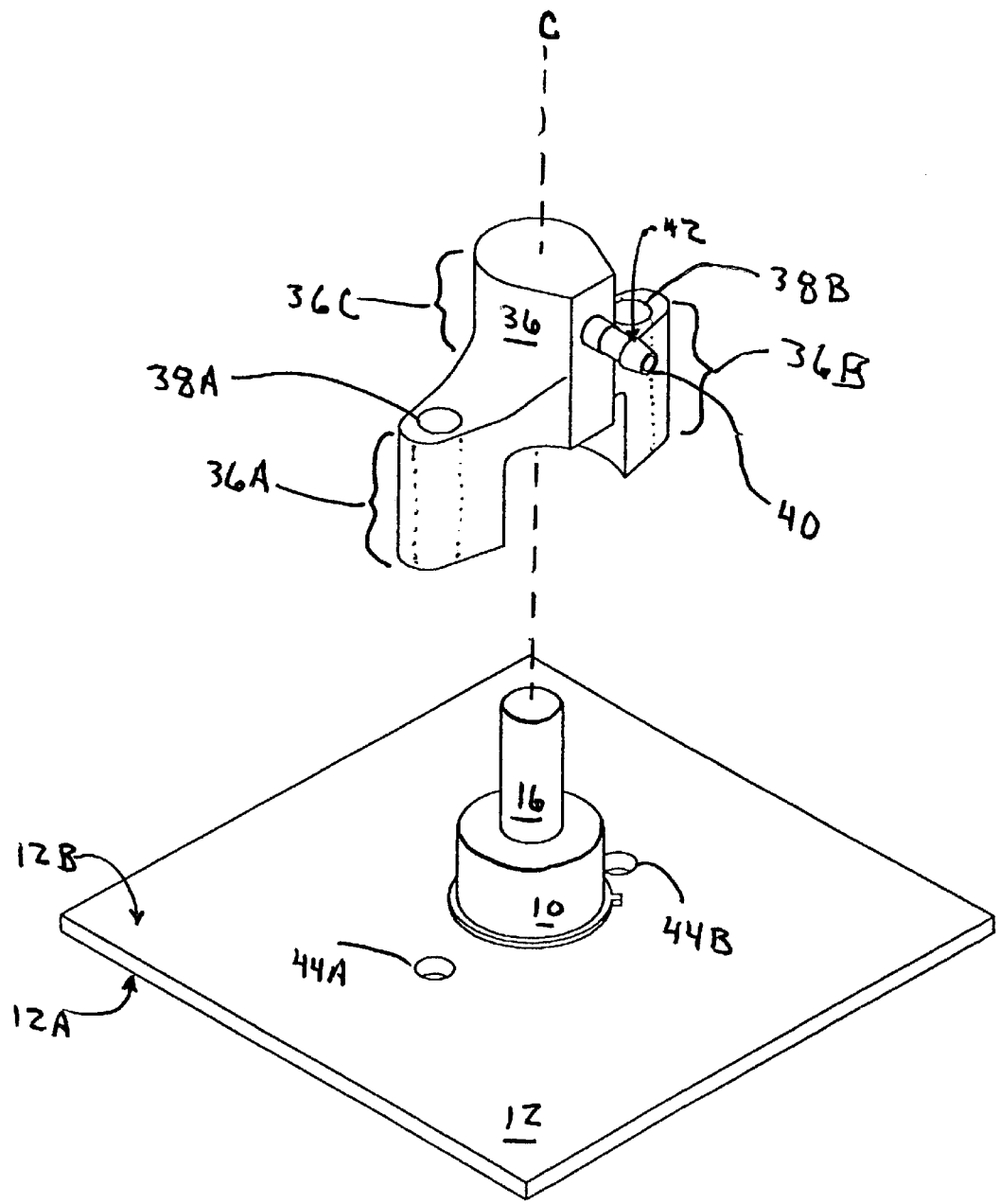
FIG. 4 is a perspective view of the mounting configuration of FIG. 3.

The present invention is shown in a perspective view in FIG. 4 prior to assembly. Specific additional features viewable in FIG. 4 include mounting through-holes 44A and 44B for receiving the mounting bolts securing housing 36 to board 12 via elongated mounting portions 36A and 36B, respectively, and ridge 42 on barb hook-up 40 for retaining supply tubing connected to the barb hook-up.

Also shown in FIG. 4 is central axis line C (dashed line) depicting the necessary alignment of board 12, transducer 10, and housing 36 for proper assembly. Each of the component parts must be aligned for assembly, e.g., the upper portion of tube 16 must be aligned with the sealing ring 37 within cavity 34 and the elongated mounting portions 36A and 36B must be aligned with the mounting through-holes 44A and 44B of board 12. Thus, alignment of elongated mounting portions 36A and 36B with the through-holes aligns the upper portion of tube 16 with sealing ring 37 and minimizes misalignment of components thereby decreasing the assembly difficulty. Further, replacement or maintenance is made easier by having much fewer parts to be aligned.

Functional

Assembly of the above-described housing configuration is now described in detail with reference to FIG. 4. First, the pressure transducer 10 is mounted to one side of printed circuit board 12 and signal leads 14 are connected to circuitry on PCB 12, as is known in the art. Second, the upper end of tube 16 is aligned and inserted into cavity 34 of housing 36, and ultimately, into sealing ring 37 in cavity 34. Cavity 34 is thereby sealed at the bottom. Housing 36 may then need to be rotated about tube 16 to bring the threaded mounting holes 38A and 38B into alignment with mounting through-holes 44A and 44B on board 12. Threaded bolts are then inserted from below board 12 through mounting through-holes 44A and 44B and threaded into threaded mounting holes 38A and 38B securing housing 36 to the upper surface 12B of board 12. Finally, tubing is attached to barb hook-up 40 and secured by ridge 42 thereby enabling the pressure to be measured or monitored to reach the transducer 10.

Thus, as has been described above, the present invention uses a single board approach minimizing alignment/assembly issues. The disclosed single board solution doesn't force a two-board design and allows the pressure transducer to remain at a usable height above the PCB. Perpendicularity issues requiring special alignment tooling in the two board configuration are eliminated using the single-board design of the present invention. The single-board solution is the alignment tool. The barb hook-up can be machined into the housing with either a vertical or horizontal orientation. Further, because the design incorporates a threaded housing, mounting nuts and washers required by previous designs are eliminated.

There are numerous advantages of the present invention in comparison to the previous two-board solution:

faster assembly;

less assembly induced rework;

no special assembly tooling required;

reduce extra mounting hardware;

tolerance issues with aligning previous design are eliminated;

easier component level testing prior to assembly; and difficult stacking board design is not required.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A pressure transducer mounting configuration comprising:

a printed circuit board;

a pressure transducer mounted on said printed circuit board;

a housing surrounding said pressure transducer on a side of said printed circuit board, wherein said housing is mounted to said printed circuit board; and wherein said pressure transducer further comprises a tube for receiving pressure to be measured by said pressure transducer and said housing further comprises a cavity for providing the pressure to the pressure transducer and a sealing ring for receiving and sealing the tube of said pressure transducer in the cavity open to the pressure.

2. The configuration as claimed in claim 1 wherein said housing further comprises at least two mounting legs for attaching said housing to said printed circuit board and wherein said mounting legs are longer than the height of said pressure transducer mounted on said printed circuit board.

3. The configuration as claimed in claim 2 wherein said mounting legs further comprise threaded mounting holes for receiving threaded bolts through said printed circuit board for attaching said housing to said printed circuit board.

4. The configuration as claimed in claim 1 wherein said housing further comprises a barb hook-up for providing pressure to said cavity.

5. The configuration as claimed in claim 4 wherein said barb hook-up may be in either a horizontal or vertical position relative to said housing.

6. The configuration as claimed in claim 2 wherein said mounting legs are circumferentially spaced from each other on said housing.

7. The configuration as claimed in claim 6 wherein said mounting legs are diametrically opposed on said housing.

8. A pressure transducer housing comprising: a central and generally cylindrical portion having (a) a central cavity open at the bottom of the cylindrical portion and (b) two elongated mounting portions connected at opposing locations along the bottom of the outside surface of the longitudinal cylindrical portion and long enough to extend above a pressure transducer when the bottom edge of the mounting portions are mounted on a printed circuit board;

a pneumatic connection connected to a through-hole in the side of the longitudinal cylindrical portion and opening to the central cavity; and further comprising a sealing ring located within the central cavity and adapted for sealing around a tube inserted into the open bottom of the central cavity.

9. The housing as claimed in claim 8 wherein said elongated mounting portions further comprise threaded mounting holes for receiving threaded bolts for attaching said housing to the printed circuit board.

10. The housing as claimed in claim 8 wherein said housing further comprises a barb hook-up for providing pressure to the cavity.

11. The housing as claimed in claim 10 wherein said barb hook-up may be in either a horizontal or vertical position relative to said housing.

12. The housing as claimed in claim 8 wherein said elongated mounting portions are circumferentially spaced from each other on said housing.

13. The housing as claimed in claim 12 wherein said elongated mounting portions are diametrically opposed on said housing.

14. A method of mounting a pressure transducer housing on a printed circuit board comprising the following steps:

mounting the pressure transducer to the printed circuit board;

mounting a housing to the printed circuit board, wherein the housing surrounds the pressure transducer on a side of the printed circuit board and provides a pressure to be measured to the pressure transducer; and wherein said pressure transducer further comprises a tube for receiving the pressure to be measured and wherein said housing further comprises a cavity for receiving the tube and providing the pressure.

15. The method as claimed in claim 14 wherein said housing further comprises a barb hook-up for providing the pressure to said cavity and receiving the pressure from a tubing.

16. The method as claimed in claim 15 wherein said barb hook-up may be in either a horizontal or vertical position relative to said housing.

17. The method as claimed in claim 14 wherein said housing further comprises at least two mounting legs for mounting said housing to said printed circuit board and wherein said mounting legs are longer than the height of said pressure transducer mounted on said printed circuit board.

18. The method as claimed in claim 17 wherein said mounting legs further comprise threaded mounting holes for receiving threaded bolts through said printed circuit board for attaching said housing to said printed circuit board.

* * * * *